(12) United States Patent
Chang et al.

(10) Patent No.: US 9,513,815 B2
(45) Date of Patent: Dec. 6, 2016

(54) MEMORY MANAGEMENT BASED ON USAGE SPECIFICATIONS

(71) Applicant: Macronix International Co., Ltd., Hsinchu (TW)

(72) Inventors: Ping-Chun Chang, Houlong Township (TW); Yuan-Hao Chang, Taipei (TW); Hung-Sheng Chang, Taipei (TW); Tei-Wei Kuo, New Taipei (TW); Hsiang-Pang Li, Zhubei (TW)

(73) Assignee: Macronix International Co., Ltd., Hsinchu (TW)

( * ) Notice: Subject to any disclaimer, the term of this patent is extended or adjusted under 35 U.S.C. 154(b) by 40 days.

(21) Appl. No.: 14/523,006

(22) Filed: Oct. 24, 2014

(65) Prior Publication Data

US 2015/0178010 A1    Jun. 25, 2015

Related U.S. Application Data

(60) Provisional application No. 61/918,616, filed on Dec. 19, 2013, provisional application No. 62/005,816, filed on May 30, 2014.

(51) Int. Cl.
*G06F 12/02* (2006.01)
*G06F 3/06* (2006.01)

(52) U.S. Cl.
CPC ............... *G06F 3/061* (2013.01); *G06F 3/064* (2013.01); *G06F 3/0644* (2013.01);
(Continued)

(58) Field of Classification Search
CPC ............... G06F 12/0223; G06F 12/023; G06F 12/0292; G06F 3/0631; G06F 3/0608; G06F 3/0683; G06F 3/0604; G06F 3/061; G06F 3/0679; G06F 12/0871; G06F 3/0601
(Continued)

(56) References Cited

U.S. PATENT DOCUMENTS 6,975,595 B2 *   12/2005   Peterson ................. H04L 29/06
                                                                  370/252
7,903,457 B2    3/2011   Lung
(Continued)

*Primary Examiner* — Pierre-Michel Bataille
(74) *Attorney, Agent, or Firm* — Yiding Wu; Haynes Beffel & Wolfeld LLP

(57) ABSTRACT

A method is provided for managing a memory device including a plurality of physical memory segments. A logical memory space is classified into a plurality of classifications based on usage specifications. The plurality of physical memory segments is allocated to corresponding logical addresses based on the plurality of classifications, and on usage statistics of the physical memory segments. A data structure is maintained recording translation between logical addresses in the logical memory space and physical addresses of the physical memory segments. The plurality of classifications includes a first classification and a second classification having different usage statistic requirements than the first classification. Logical addresses having the second classification can be redirected to physical segments allocated to logical addresses having the first classification, and the data structure can be updated to record redirected logical addresses. A free command can release a physical memory segment allocated for main memory use.

22 Claims, 15 Drawing Sheets

Examples for logical address to physical address translation

(52) U.S. Cl.
CPC .......... *G06F 3/0679* (2013.01); *G06F 12/023* (2013.01); *G06F 12/0238* (2013.01); *G06F 12/0292* (2013.01); *G06F 2212/1024* (2013.01); *G06F 2212/202* (2013.01); *G06F 2212/214* (2013.01); *G06F 2212/7201* (2013.01)

(58) Field of Classification Search
USPC .......................... 711/103, 170, 118, E12.019
See application file for complete search history.

(56) References Cited

U.S. PATENT DOCUMENTS

| | | | | |
|---|---|---|---|---|
| 8,650,377 | B2 * | 2/2014 | Maniwa | G06F 3/061 |
| | | | | 711/165 |
| 8,935,493 | B1 * | 1/2015 | Dolan | G06F 3/0649 |
| | | | | 711/117 |
| 8,966,155 | B1 * | 2/2015 | Mulligan | G06F 12/0246 |
| | | | | 711/103 |
| 9,032,234 | B2 * | 5/2015 | Zaarur | G06F 12/023 |
| | | | | 711/165 |
| 9,189,385 | B2 * | 11/2015 | Cohen | G06F 12/0246 |
| 9,378,136 | B1 * | 6/2016 | Martin | G06F 12/0246 |
| 2003/0061444 | A1 * | 3/2003 | Herbst | G06F 3/0601 |
| | | | | 711/118 |
| 2012/0170359 | A1 | 7/2012 | Wu et al. | |
| 2014/0281172 | A1 * | 9/2014 | Seo | G06F 12/0246 |
| | | | | 711/103 |
| 2015/0220137 | A1 * | 8/2015 | Zaarur | G06F 12/023 |
| | | | | 713/320 |

* cited by examiner

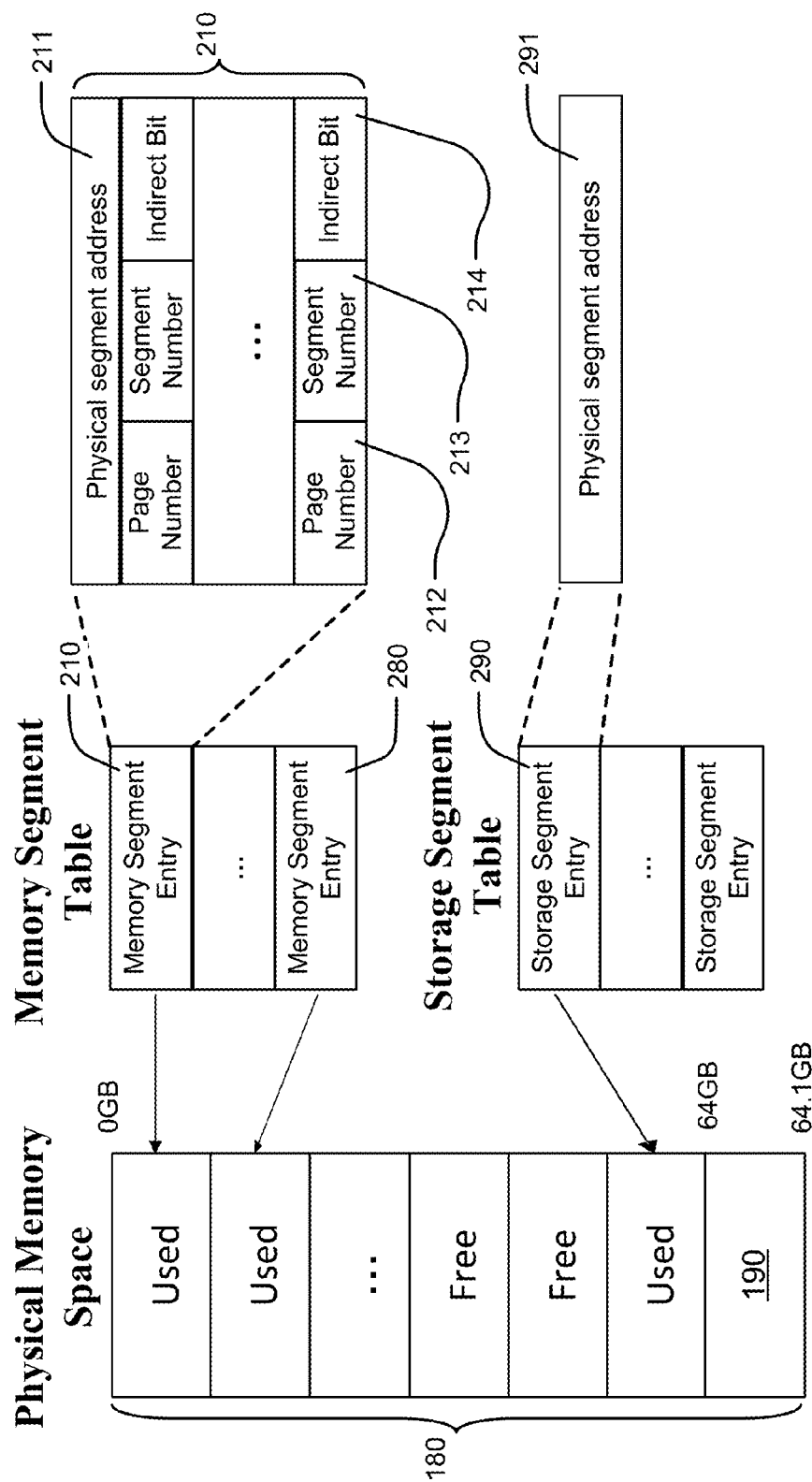
FIG. 2: Data structure for logical address to physical address translation

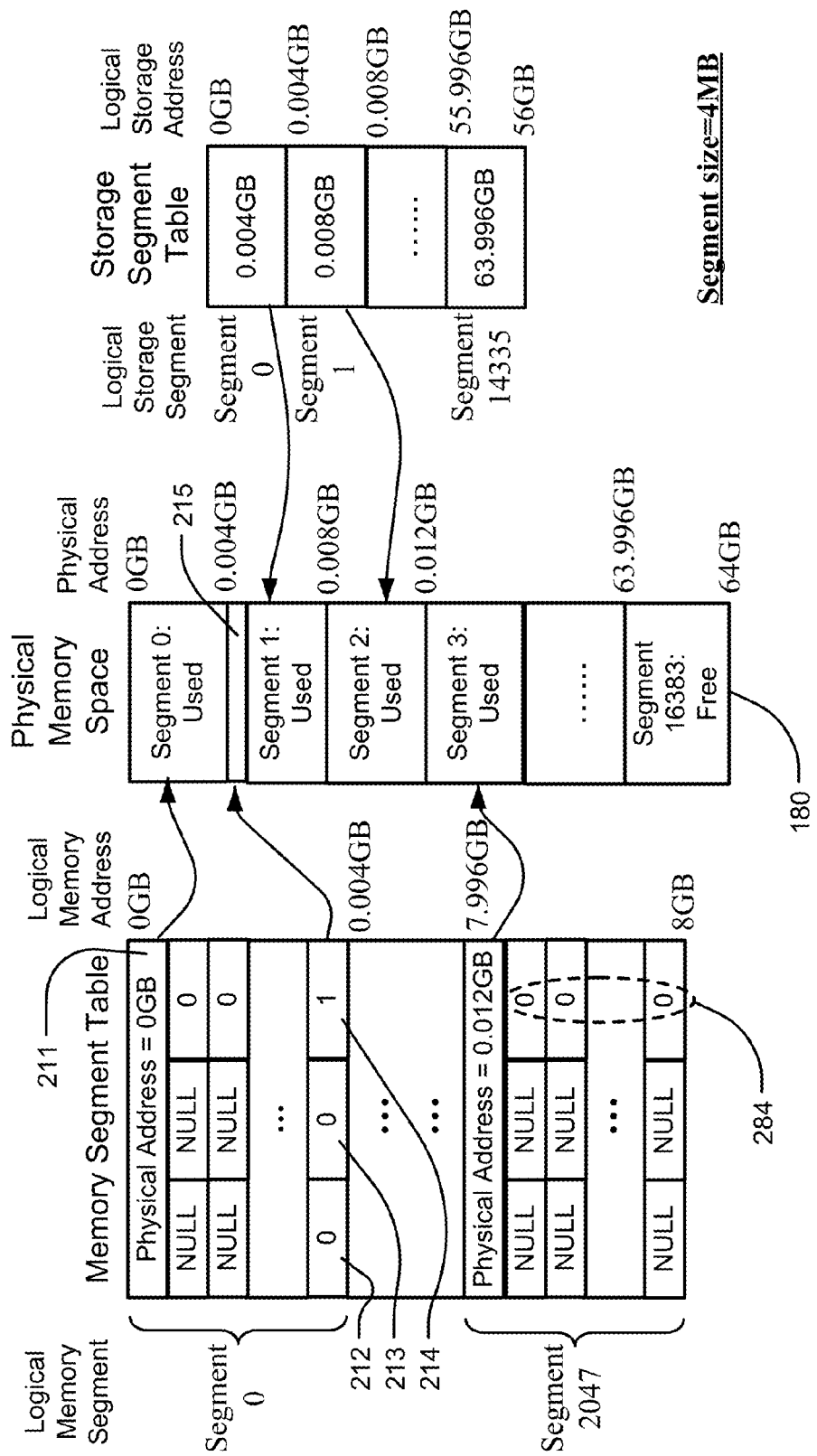
FIG. 2A: Examples for logical address to physical address translation

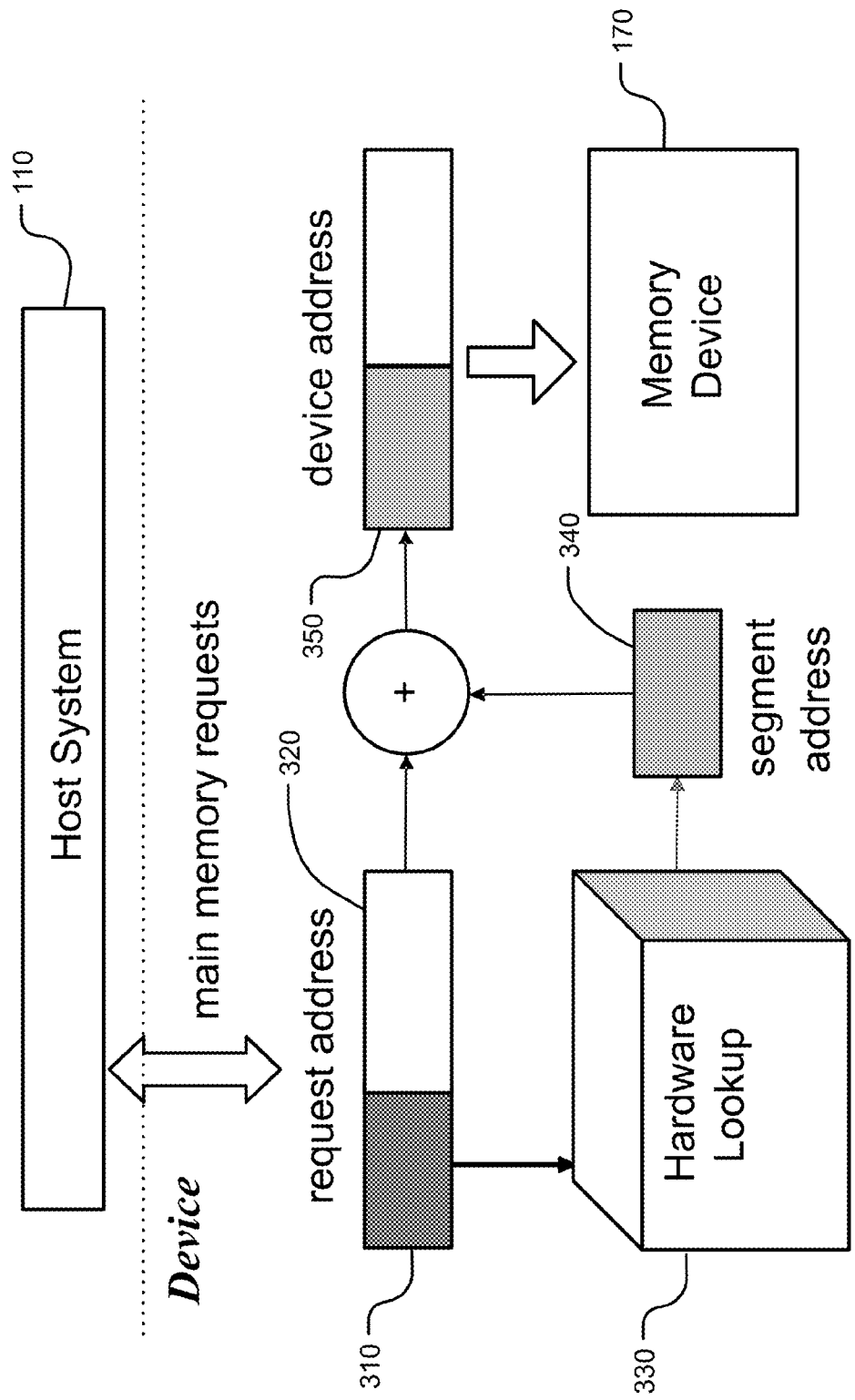
FIG. 3: Main memory manager

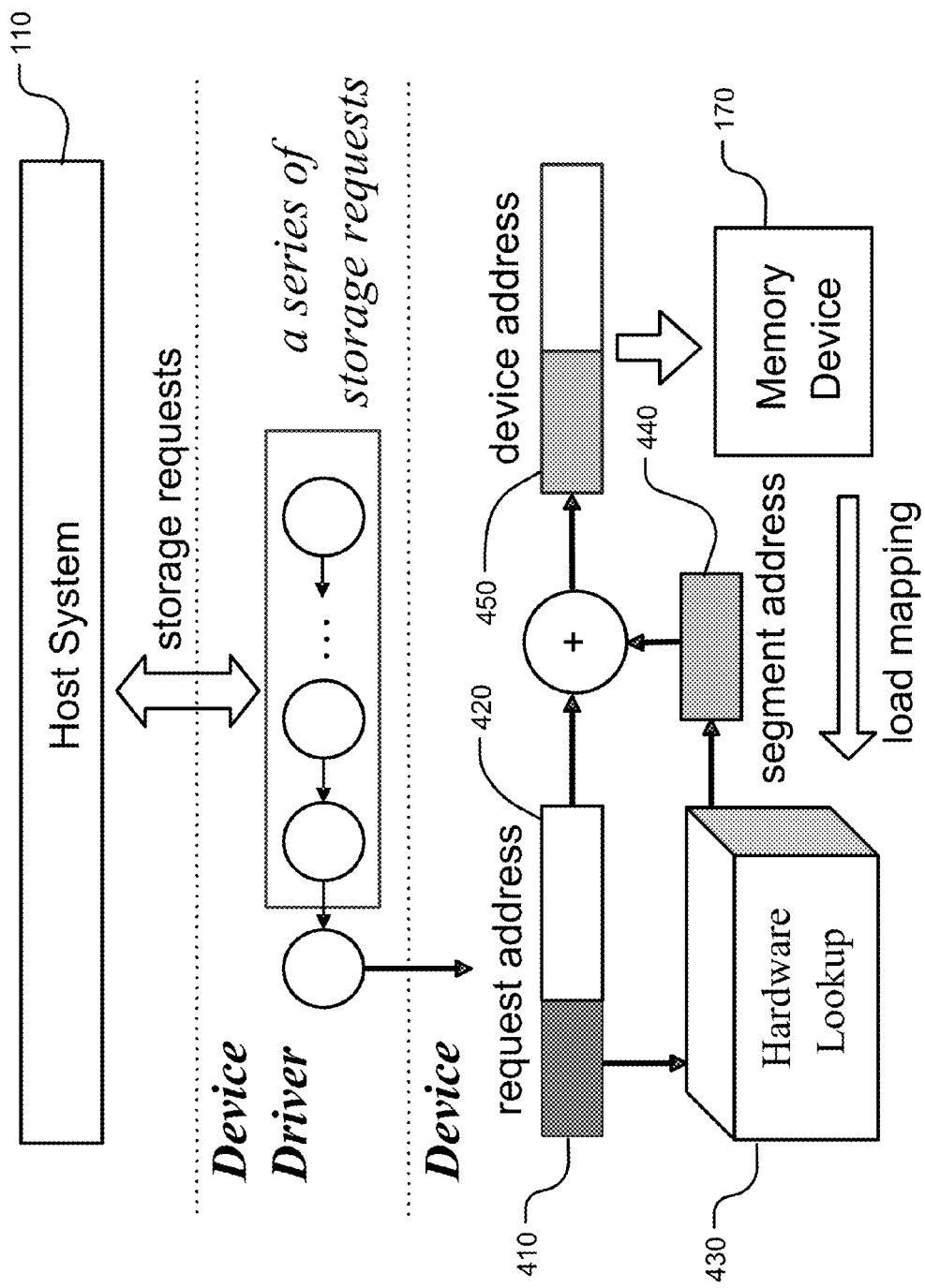
FIG. 4: Storage Manager

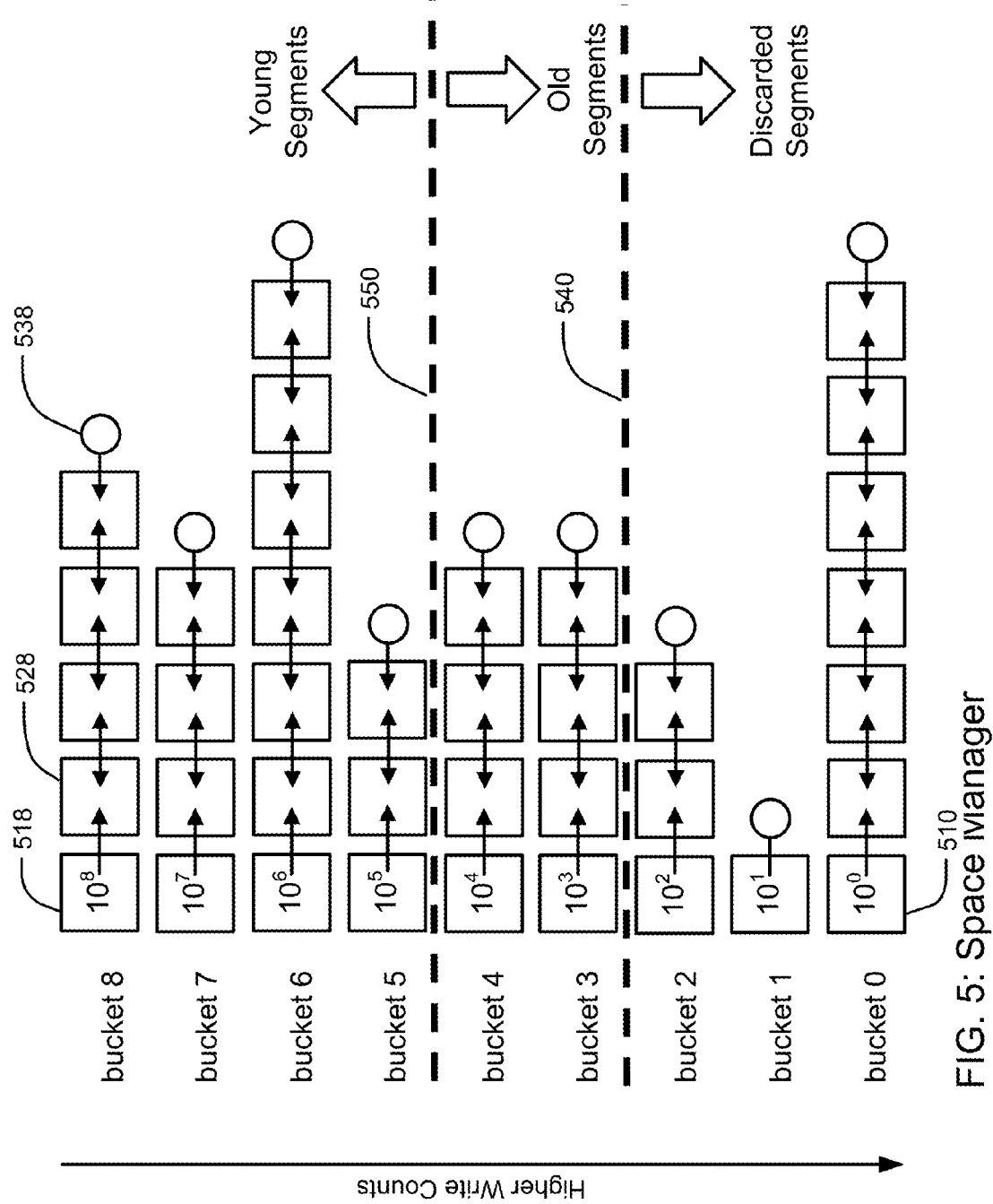

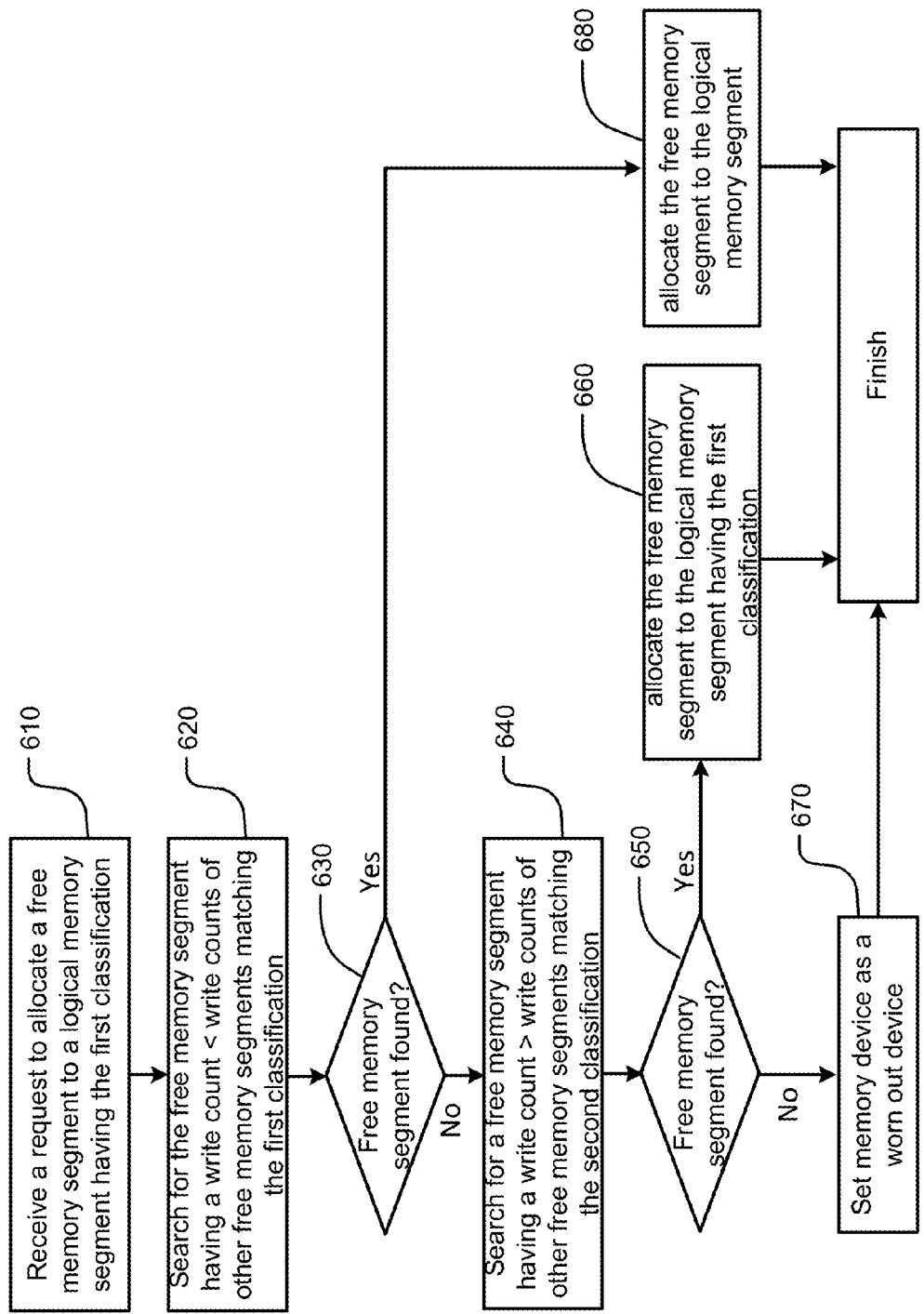
FIG. 6: Allocating a free physical memory segment for storage use

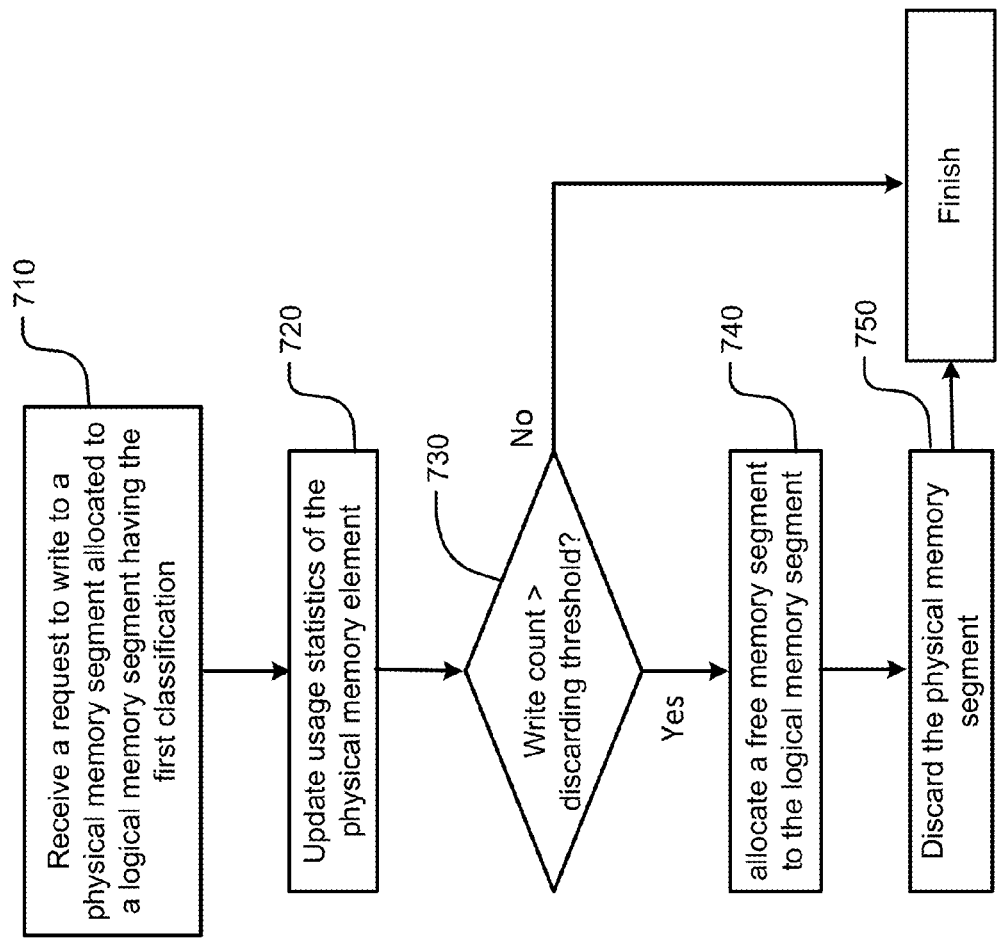
FIG. 7: Discarding a physical memory segment

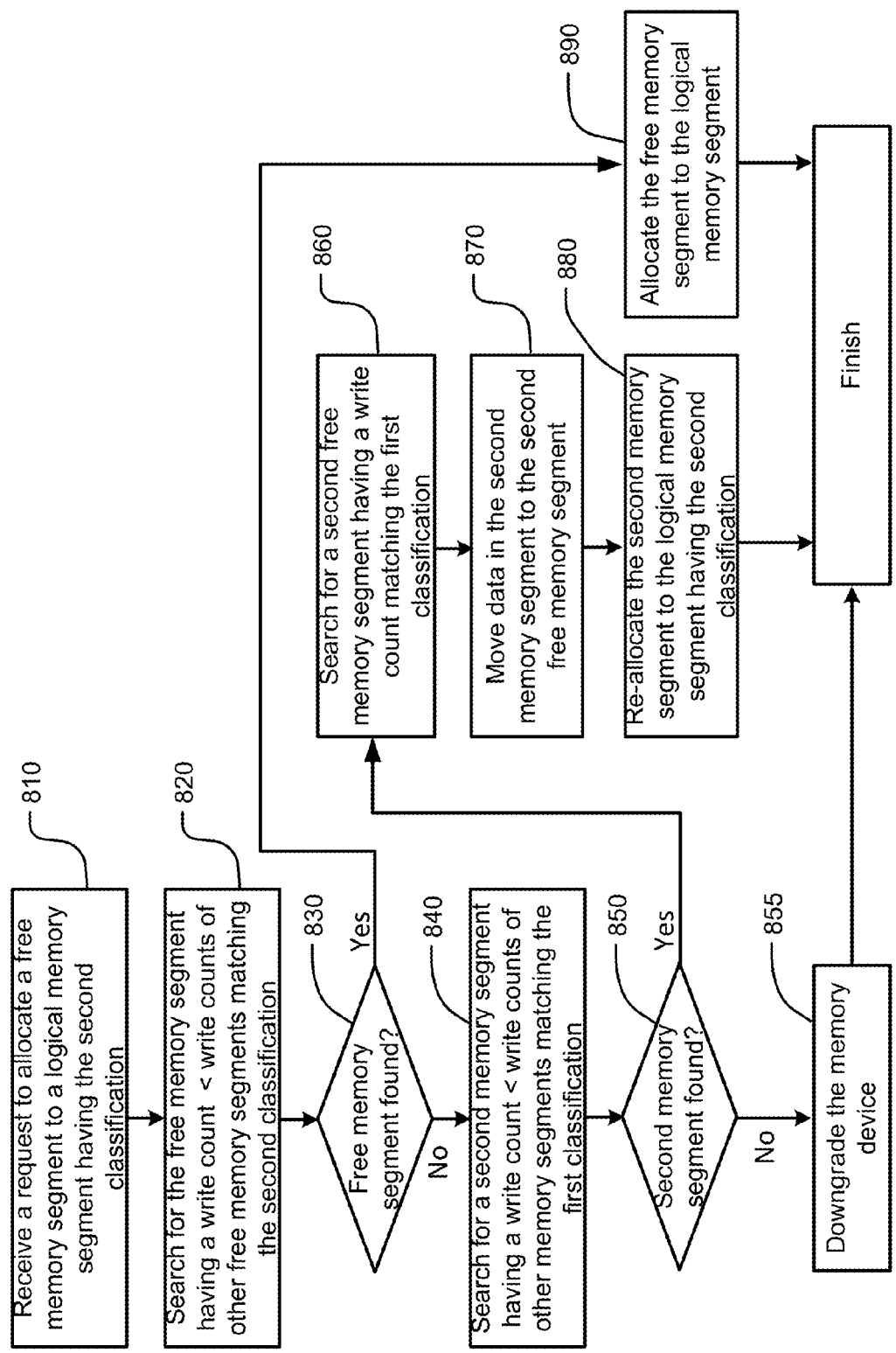
FIG. 8: Allocating a free physical memory segment for main memory use

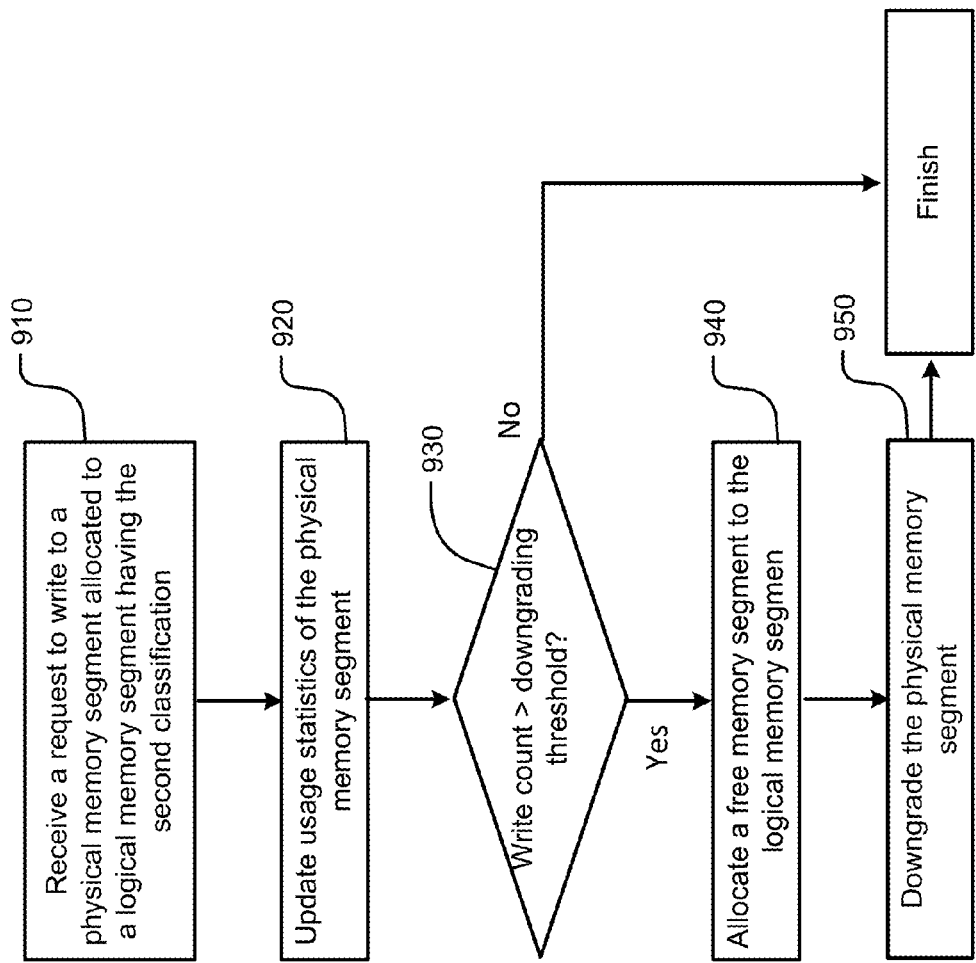
FIG. 9: Downgrading a physical memory segment

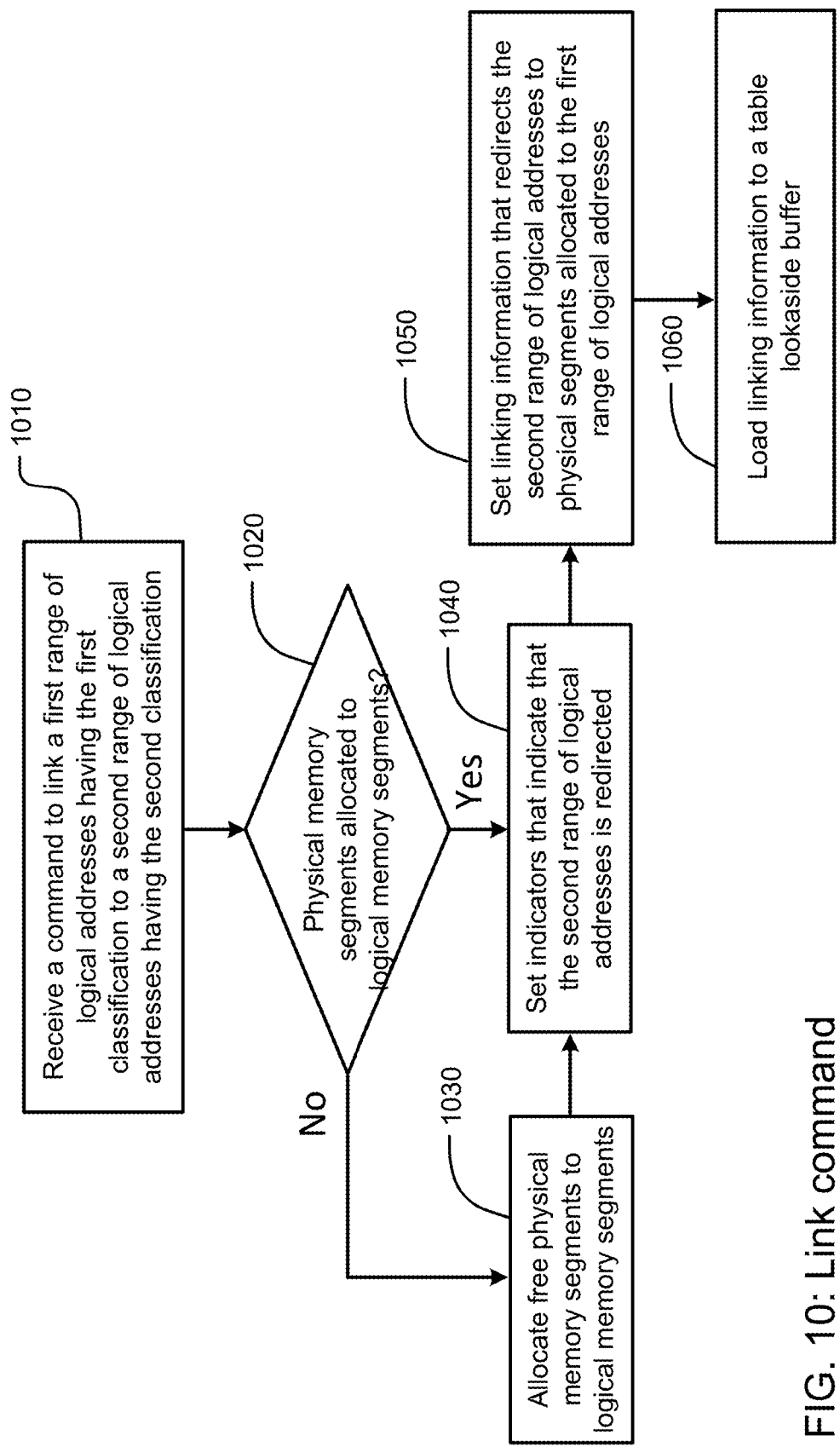
FIG. 10: Link command

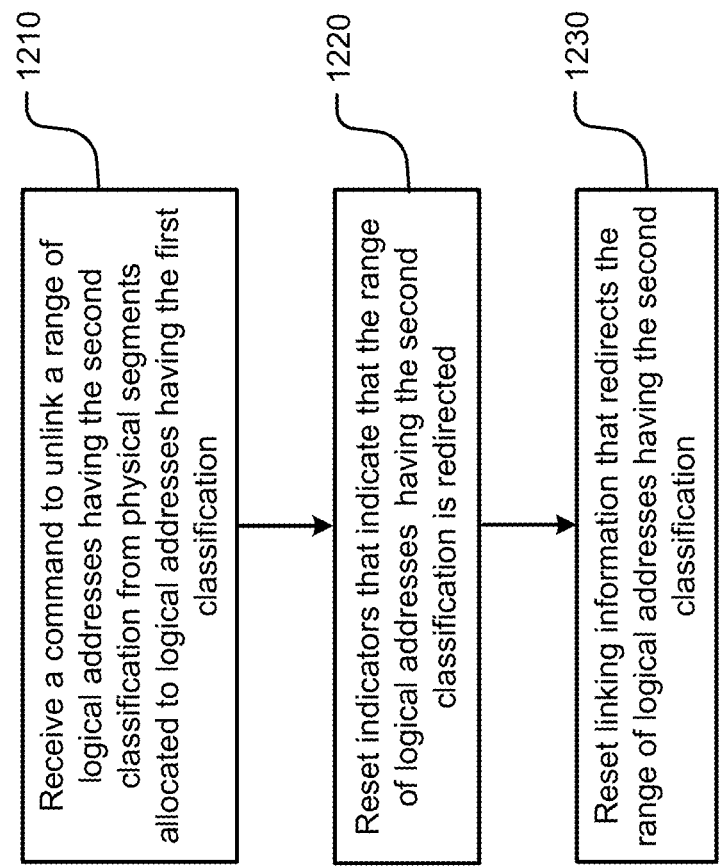
FIG. 12: Unlink command

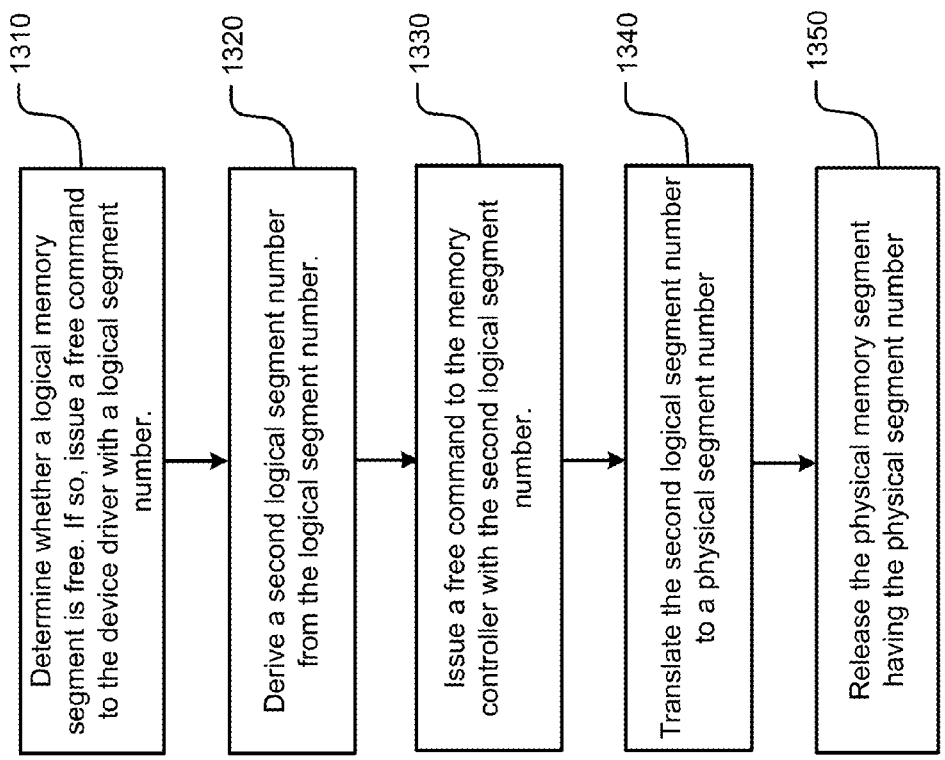
FIG. 13: Free command

MEMORY MANAGEMENT BASED ON USAGE SPECIFICATIONS

REFERENCE TO RELATED APPLICATION

This application claims benefit of U.S. Provisional Patent Application No. 61/918,616 filed on 19 Dec. 2013, and U.S. Provisional Patent Application No. 62/005,816 filed on 30 May 2014. Both provisional patent applications are incorporated by reference as if fully set forth herein.

BACKGROUND

1. Field of the Invention

The present invention relates to memory devices and systems including memory management.

2. Description of Related Art

Storage media used for large scale storage can be more than three orders of magnitude slower than media used for main memory devices configured for high speed access. Such performance gap between main memory and storage has become a critical design issue for computing systems, as many applications require intensive input/output traffic between main memory and storage. Some types of non-volatile memory, such as phase change memory, can be used both for main memory and for storage because of its byte-addressability, non-volatility, capacity scalability, and high access performance. However, nonvolatile memory often has write endurance limitations. Write endurance limitations for nonvolatile memory such as phase change material based memory can be about $10^6$-$10^9$ cycles, while read/write limitations for dynamic random access memories (DRAM) can be more than $10^{15}$ cycles. Without memory management with regard to cycle counts, some parts of the storage media may be overused and wear out prematurely or even cause system failure. This can be particularly likely when the non-volatile memory is used for both main memory and mass storage.

It is desirable to provide a memory management scheme to enable utilization of non-volatile memory, like phase change memory, for multiple purposes, such as for both main memory and mass storage, while keeping a low input/output traffic overhead.

SUMMARY

A method is provided for managing a memory device including a plurality of physical memory segments. A logical memory space is classified into a plurality of classifications based on usage specifications, such as classes utilized for fast read specifications suitable for main memory and classes utilized for long endurance specifications suitable for mass storage. The plurality of physical memory segments is allocated to corresponding logical addresses based on classifications of the logical addresses in the plurality of classifications, and on usage statistics of the physical memory segments. A data structure is maintained recording translation between logical addresses in the logical memory space and physical addresses of the physical memory segments. The data structure can include logical to physical translation tables for respective classifications, and a translation lookaside buffer (TLB) used by a memory management system for improving speed of logical to physical address translation. The plurality of classifications can include a first classification, such as suitable for long term storage use, and a second classification, such as suitable for main memory use, that have different usage statistic requirements than the first classification. Highly used physical segments, to which logical addresses having the second classification are mapped, can be protected from exceeding endurance limitations by redirecting their logical addresses to physical segments allocated to logical addresses having the first classification. The data structure can be updated to record redirected logical addresses.

In a technology described herein, a plurality of sets of buckets including identifiers of free physical memory segments can be maintained based on usage statistics of the free memory segments. A bucket is a data structure that can comprise a list of physical segments that have usage statistics matching the usage criteria applied to the bucket. The plurality of sets of buckets can correspond one-to-one, or plural-to-one, with the plurality of classifications. A free memory segment can be allocated, such as by updating the logical to physical address mapping, to a logical address in a particular classification in the plurality of classifications in a bucket corresponding to usage statistics that match the particular classification. When a free memory segment is allocated, it is removed from the bucket. A physical memory segment can be deallocated, for example if the operating system releases the memory space or if it no longer matches the usage criteria for the classification. When a physical memory segment is deallocated and becomes a free memory segment, it is added to a bucket in a set in the plurality of sets of buckets, where the deallocated physical memory segment has a usage statistic matching the usage statistics of the bucket to which it is added.

Link and unlink commands are provided to redirect logical memory segments for main memory use to physical segments allocated for long term storage use, instead of physically copying data from a long term storage device to a main memory device, reducing the overhead on loading and storing data between main memory and long term storage. A free command is provided to allow the host system to release a logical memory segment for main memory use that is no longer used by the host system.

Other aspects and advantages of the present invention can be seen on review of the drawings, the detailed description and the claims, which follow.

BRIEF DESCRIPTION OF THE DRAWINGS

FIG. 2 illustrates a data structure for translation between logical addresses in the logical memory space and physical addresses of the physical memory segments.

FIG. 2A illustrates examples of logical to physical address translation using the data structure illustrated in FIG. 2.

FIG. 3 illustrates an implementation of the main memory manager.

FIG. 4 illustrates an implementation of the storage manager.

FIG. 5 illustrates an implementation of the space manager.

FIG. 6 is a flow chart for allocating a free memory segment to a logical memory segment having the first classification in the logical memory space of the memory device.

FIG. 7 is a flow chart for discarding a physical memory segment.

FIG. 8 is a flow chart for allocating a free memory segment to a logical memory segment having the second classification in the logical memory space of the memory device.

FIG. 9 is a flow chart for downgrading a physical memory segment.

FIG. 10 is a flow chart for a link command.

FIG. 12 is a flow chart for an unlink command.

FIG. 13 is a flow chart for a free command.

DETAILED DESCRIPTION

Figure 1:
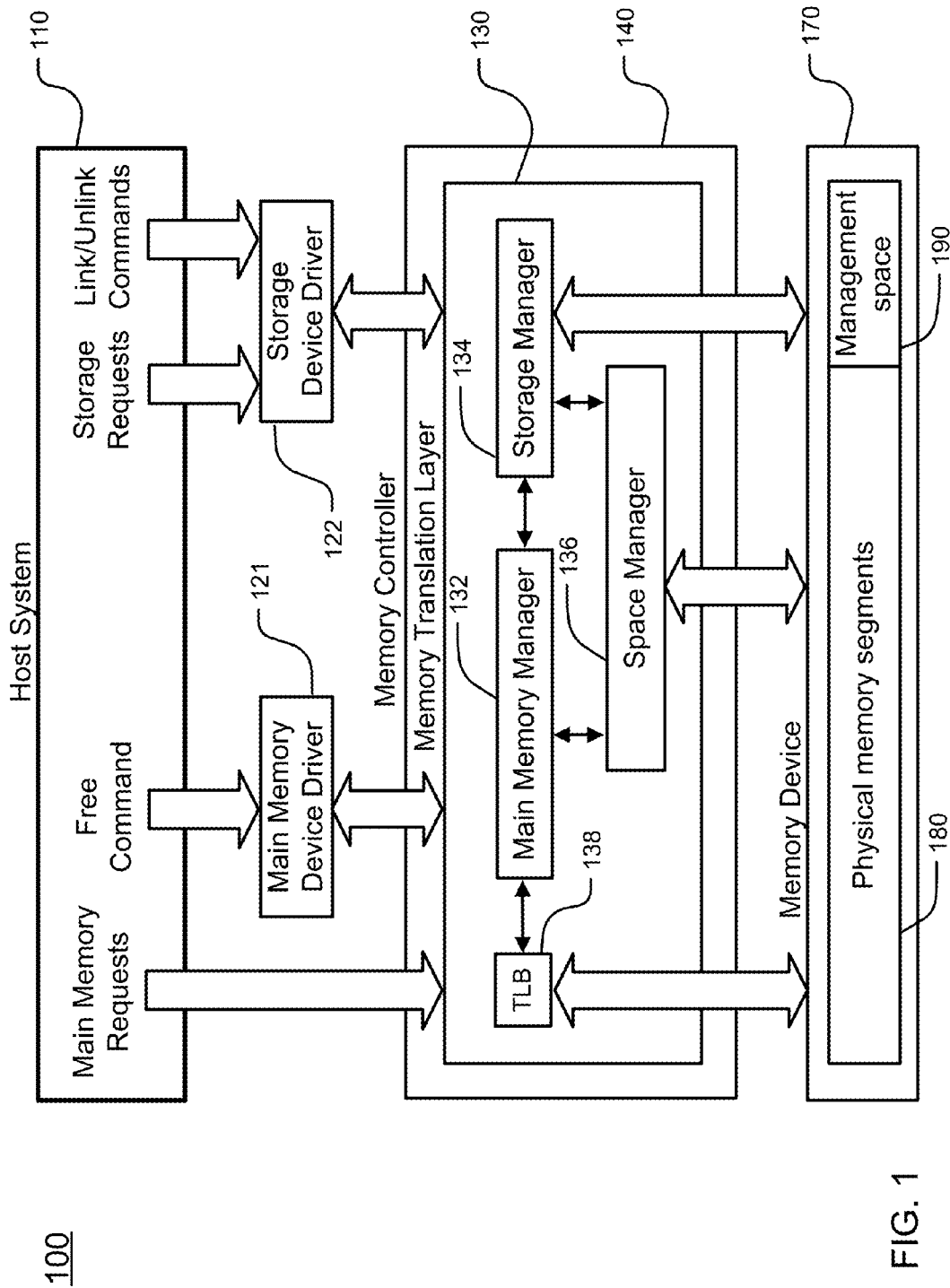
FIG. 1 is a block diagram of an example memory management system.

A detailed description of embodiments of the present invention is provided with reference to the Figures. The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

FIG. 1 is a block diagram of an example memory management system 100 including a host system 110, a memory controller 140 and a memory device 170. The host system 110 is coupled to a main memory device driver 121 and a storage device driver 122. The memory controller 140 includes a memory translation layer 130, which includes a main memory manager 132, a storage manager 134, a space manager 136, and a translation lookaside buffer (TLB) 138. The memory device 170 includes physical memory space 180 including physical memory segments, and a management space 190. Physical memory segments in the physical memory space 180 can be allocated for main memory use or longer term storage use. The management space can store a memory segment table, a storage segment table, a bucket list of free physical memory segments, and linking information used by the link and unlink commands, as described herein. The memory controller 140 is coupled to the host system 110, the main memory device driver 121, the storage device driver 122, and the memory device 170. Although only one memory device is shown, the memory controller can be coupled to and control multiple memory devices. The host system issues main memory requests, storage requests, a free command, a link command, and an unlink command to the memory controller, via main memory device driver 121 and storage device driver 122.

If a logical address is requested for main memory use by a main memory request, the main memory manager 132 handles the address translation from the requested logical address to its corresponding physical address in the memory device. If a logical address is requested for long term storage use by a storage request, the storage manager 134 handles the address translation from the requested logical address to its corresponding physical address in the memory device. If the requested logical address is not mapped to any physical address, the space manager 136 is invoked to allocate a physical memory segment for the main memory manager or the storage manager based on write endurance. The translation lookaside buffer (TLB) 138 stores translation results between a logical address of a logical segment as used by the host system 110 and a corresponding physical address of a physical segment as used by the memory device 170 for improving the performance of address translation.

The logical memory space of the memory device is classified into a plurality of classifications based on usage specifications. The usage specifications can include main memory with short term storage use and for fast access by a central processing unit (CPU), and storage memory with long term storage use. The plurality of classifications can include a first classification, such as suitable for long term storage use, and a second classification, such as suitable for main memory use, that have different usage statistic requirements than the first classification.

Figure 1A:
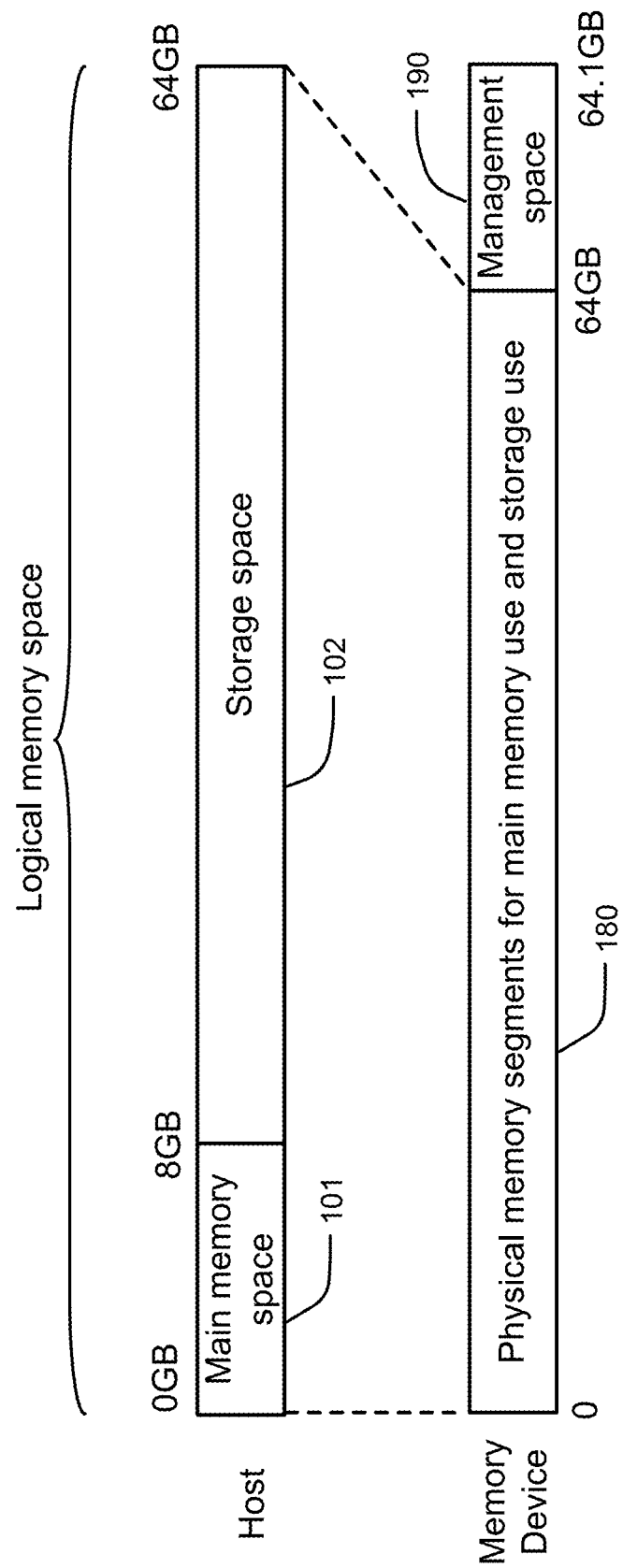
FIG. 1A illustrates the main memory space and storage space in a host system and corresponding physical memory segments in a memory device.

FIG. 1A illustrates the main memory space and storage space in a host system and corresponding physical memory segments in a memory device. In one implementation, in a memory device having a size of 64.1 GB (gigabytes), 100 MB (i.e. 0.1 GB) of the 64.1 GB can be reserved for the management space (e.g. 190), while 64 GB of the 64.1 GB can be reserved for physical memory segments in the physical memory space (e.g. 180). The host system can maintain a logical memory space of 64 GB corresponding to the physical memory space 180, including a logical main memory space (e.g. 101) for main memory use, and a logical storage space (e.g. 102) for long term storage use. For instance, the logical main memory space 101 can have 8 GB, and the logical storage space 102 can have 56 GB. Although in this example a ratio of the memory for main memory use vs the memory for long term storage use is 8 to 56, the ratio can be defined by the memory management system.

FIG. 2 illustrates a data structure for translation between logical addresses in the logical memory space and physical addresses of the physical memory segments in the memory device. The data structure can include a storage segment table for physical memory segments allocated for long term storage use, and a memory segment table for physical memory segments allocated for main memory use. The storage segment table and the memory segment table can be stored in the management space (e.g. 190).

In one implementation, each physical memory segment in the plurality of physical memory segments can have a fixed-size such as 4 MB (megabytes), and can be used as the unit for memory allocation and address translation. Each physical memory segment can be further divided into fixed-sized physical pages (e.g., 4 KB pages) and each physical page can include a fixed number of physical lines, where the size of a physical line is the same as the cache line size (e.g., 64 B) of a CPU (central processing unit). A cache line is the basic unit of CPU to access memory. Each physical memory segment in the memory device can be allocated for main memory use by turns, so that write endurance issue of non-volatile memory as main memory can be resolved by distributing writes to each physical memory segment as evenly as possible.

The logical memory space of the memory device is classified into a plurality of classifications based on usage specifications. For instance, the usage specifications can include specifications for main memory use and for long term storage use. Each classification can be further divided into fixed-sized logical memory segments that have the same size as physical memory segments. Each logical memory segment can be further divided into fixed-sized logical pages that have the same size as physical pages, and logical lines that have the same size as physical lines. Consequently, a logical memory segment can be mapped to a physical memory segment.

The storage segment table includes storage segment entries. Each storage segment entry (e.g. 290) includes the address of a physical memory segment (e.g. 291) mapped to a corresponding logical segment for long term storage use. When a physical segment in the memory device is allocated to a logical memory segment in the storage space, the physical address of the physical segment is recorded in the storage segment entry. Likewise, the memory segment table includes memory segment entries (e.g. 210, 280). Each memory segment entry (e.g. 210) includes the address of a physical memory segment (e.g. 211) mapped to a corresponding logical segment for main memory use. When a physical segment in the memory device is allocated to a logical memory segment in the main memory space, the physical address of the physical segment is recorded in the memory segment entry.

Each memory segment entry (e.g. 210) can also include a page number (e.g. 212), a segment number (e.g. 213), and an indirect bit (e.g. 214) for each page in a segment in the main memory space that is linked to a page in a physical segment allocated for long term storage use. For instance, if a memory segment has a size of 4,096 KB and a page has a size of 4 KB (kilobyte), then the memory segment includes 4,096 KB/4 KB=1024 memory pages, and the memory segment entry for the memory segment can include up to 1024 sets of the page number, the segment number, and the indirect bit. The page number, the segment number, and the indirect bit are used by a link command and an unlink command. The link and unlink commands are further described in connection with FIGS. 10 and 11.

FIG. 2A illustrates examples of logical to physical address translation using the data structure illustrated in FIG. 2. As illustrated in the example of FIG. 2A, a physical memory space has a size of 64 GB and includes physical memory segments 0-16383. Each physical memory segment has a size of 4 MB. Physical memory segments 0, 1, 2, 3 and 16383 are at physical addresses 0 GB, 0.004 GB, 0.008 GB, 0.012 GB, and 63.996 GB, respectively. Physical memory segment 1 includes a physical memory page 215 that is used by the memory segment table and the storage segment table simultaneously. A physical memory segment is used if it is allocated for main memory use or for long term storage use, otherwise the physical memory segment is free to be allocated. For instance, physical memory segments 0-3 are used, while physical memory segment 16383 is free.

As illustrated in the example of FIG. 2A, the memory segment table includes memory segment entries for logical memory segments in the logical main memory space (e.g. 101, FIG. 1A). The logical main memory space has a size of 8 GB with logical memory addresses starting from 0 GB, and includes logical memory segments 0-2047. Each logical memory segment has the same size as each physical memory segment in the physical memory space, for example, 4 MB. Logical memory segments 0 and 2047 are at logical addresses 0 GB, and 7.996 GB, respectively.

The memory segment entry for logical memory segment 0 includes the physical address 0 GB (e.g. 211), indicating a physical memory segment at physical address 0 GB has been allocated to logical memory segment 0 in the logical main memory space.

The memory segment entry for logical memory segment 0 also includes a page number having a value of '0' (e.g. 212), a segment number having a value of '0' (e.g. 213), and an indirect bit having a value of '1' (e.g. 214), indicating that the last logical page of the logical memory segment 0 has been linked to the logical storage page 0 of the logical storage segment 0 in physical memory segment '1' (e.g. 215), and thus the last page of the logical memory segment 0 in the main memory space is not translated to the physical segment 0 at the physical address 0 GB (e.g. 211). The page number 212, segment number 213, and indirect bit 214 indicate that the last page of the logical memory segment 0 is mapped to the first logical storage LBA (logical block address) of the logical storage segment 0.

As used in the present specification, a page represents a basic unit in the logical main memory space, and an LBA (logical block address) represents a basic unit in the logical storage space. In one implementation, a size of a page is the same as a size of an LBA, such that transformation between different sizes of a page and an LBA can be eliminated. For instance, a page can have a size of 4 KB, and an LBA can have the same size of 4 KB.

If the indirect bit for a logical memory page has a value of '0', then the logical memory segment is translated to the physical address in the memory segment entry (e.g. 211). For instance, the physical address in the memory segment entry for the logical memory segment 2047 is 0.012 GB, and the indirect bit has a value of '0' for all logical pages in the logical memory segment 2047 (e.g. 284). Consequently, each logical memory page in the logical memory segment 2047 is translated to a corresponding memory page in the physical memory segment 3 at physical address 0.012 GB.

When the indirect bit in a memory segment entry for a logical memory page has a value of '0', the page number and segment number in the memory segment entry have values of 'NULL', indicating the logical memory page in the main memory space is not linked to any physical page in any physical memory segment.

As illustrated in the example of FIG. 2A, the storage segment table includes storage segment entries for logical storage segments in the logical storage space (e.g. 102, FIG. 1A). The logical storage space has a size of 56 GB with logical storage addresses starting from 0 GB, and includes logical memory segments 0-14335. Each logical memory segment has the same size as each physical memory segment in the physical memory space, for example, 4 MB. Logical memory segments 0, 1 and 14335 are at logical addresses 0 GB, 0.004 GB and 55.996 GB, respectively.

The storage segment entry for logical storage segment 0 in the logical storage space (e.g. 102) for long term storage use includes the physical address 0.004 GB, indicating a physical memory segment at physical address 0.004 GB has been allocated to logical storage segment 0 for long term storage use at logical storage address 0.000 GB in the logical storage space. Likewise, the storage segment entry for logical storage segment 1 in the logical storage space (e.g. 102) for long term storage use includes the physical address 0.008 GB, indicating a physical memory segment at physical address 0.008 GB has been allocated to logical storage segment 1 for long term storage use at logical storage address 0.004 GB in the logical storage space.

FIG. 3 illustrates an implementation of the main memory manager (e.g. 132, FIG. 1). Due to the limited time allowed to perform address translation for main memory requests, the main memory manager is supported by the address translation hardware to translate the request address to its corresponding physical address. As shown in the example of FIG. 3, when a main memory request is received to access the main memory, the request address is divided into a segment address (e.g. 310) and a segment offset (e.g. 320). The segment address indicates the logical memory segment in which the request address resides, so that it can be used as an index to find out the address of its residing logical segment's corresponding physical memory segment by looking up the memory segment table stored in the "hardware lookup" component (e.g. 330) of the address translation hardware. The physical segment address produced by the "hardware lookup" component (e.g. 340) is combined with the segment offset (e.g. 320) by the hardware circuit as indicated by a circle with a plus sign to derive the physical device address (e.g. 350) of the received main-memory request. The derived physical segment address can be used to access a physical memory segment in the memory device 170.

The memory segment table (FIG. 2) can be stored in the management space (e.g. 190, FIG. 1) and loaded to the "hardware lookup" component (e.g. 330) on demand. The memory segment table can also be stored in the address translation hardware, if the memory segment table can fit in the address translation hardware.

FIG. 4 illustrates an implementation of the storage manager. The storage manager (e.g. 134, FIG. 1) manages the storage segment table (FIG. 2) stored in the management space for address translation from the request addresses to their corresponding physical addresses. The storage segment table can be loaded from the management space in the memory device. The address translation (e.g. 430) for storage requests does not need the support of address translation hardware, as needed for main memory requests, because it only takes a small portion of the time on serving storage requests. However, storage requests from the host system is in the unit of a page (e.g. 4096 bytes), even though a non-volatile memory device such as a phase change memory device is byte-addressable and receives requests to access memory addresses in the unit of a processor word or cache line. Thus, a storage request issued from the host system to access pages of data can be pre-processed by a device driver, so that the storage request is transformed into a series of requests to corresponding memory addresses of the pages, as shown in FIG. 4. When the storage manager receives a transformed storage request, the request address is divided into a segment address (e.g. 410) and a segment offset (e.g. 420). The segment address indicates the logical segment in which the request address resides, so that it is used as an index to look up the storage segment table for the physical segment of its corresponding logical segment. The derived physical segment address (e.g. 440) is merged with the segment offset (e.g. 420) to derive the physical address (e.g. 450) of the received storage request. The physical address (e.g. 450) can then be used to access a physical memory segment in the memory device 170.

FIG. 5 illustrates an implementation of the space manager, using a plurality of sets of buckets of free memory segments corresponding to the plurality of classifications. The space manager (e.g. 136, FIG. 1) manages and allocates free physical segments based on classifications in the plurality of classifications, and on usage statistics of the physical memory segments. The space manager is invoked by the main memory manager 132 to allocate free physical segments to logical memory segments for main memory use, or by the storage manager 134 to allocate free physical segments to logical memory segments for long term storage use.

The space manager can maintain the plurality of sets of buckets of free memory segments using information in the usage statistics of the physical memory segments. For instance, the usage statistics can include write counts of the free memory segments. In one implementation, the write count of a physical memory segment is incremented when a write operation is executed on the physical memory segment. As shown in the example of FIG. 5, buckets 8 through 0 are maintained in order of higher write counts, where bucket 8 has the lowest write count and bucket 0 has the highest write count. Each bucket links free physical segments that have similar write counts. A free physical segment can be added to the tail of a corresponding bucket, as indicated by a circle for each bucket (e.g. 538 for bucket 8), when the physical segment is released by the host system. A free physical segment can be removed from the head of the bucket (e.g. 528 for bucket 8) when the free physical segment is allocated to a logical segment.

A remaining write count of a physical memory segment can be derived by subtracting the write count of the physical memory segment from a remaining write count upper limit corresponding to the write endurance of the memory device. The write count of a physical memory segment can be the highest of write counts of the physical pages and/or physical lines in the physical memory segment. As shown in the example of FIG. 5, remaining write counts of physical memory segments in bucket 8 are on the order of $10^8$, as shown in box 518, while remaining write counts of physical memory segments in bucket 0 are on the order of $10^0$, as shown in box 510. In this example, the remaining write count upper limit can be $10^8$. Write counts or remaining write counts of adjacent buckets can differ by an order of magnitude.

In one implementation, the first classification (e.g. for long term storage use) corresponds to a set of buckets including buckets 3 and 4 between a discarding threshold (e.g. 540) and a downgrading threshold (e.g. 550), and the second classification (e.g. for main memory use) corresponds to a set of buckets including buckets 5 through 8 above the downgrading threshold 550. If the remaining write count of a free physical segment is below the downgrading threshold, the free physical segment can be moved to a bucket below the downgrading threshold and re-allocated to logical addresses for long term storage use. Free physical segments above the downgrading threshold can be referred to as young segments, free physical segments between the discarding threshold and downgrading thresholds can be referred to as old segments. Free physical segments below the discarding threshold 540, such as in buckets 0 through 2, can be discarded because the remaining write counts of buckets 0 through 2 are too low, such as on the order of $10^0$ to $10^2$.

Although FIG. 5 describes an implementation of the space manager using a plurality of sets of buckets of free memory segments, the space manager can be implemented with other data structures, such as a tree-based structure that can be applied to a joint main memory and storage translation layer.

FIG. 6 is a flow chart for allocating a free memory segment to a logical memory segment having a first classification in the logical memory space of the memory device, where the first classification has different usage statistic requirements than the second classification.

At Step 610, a request is received to allocate a free memory segment to a logical memory segment having the first classification (e.g. for long term storage use). At Step 620, a search is executed for a free memory segment that have a write count matching the first classification and lower than write counts of other free memory segments matching the first classification. In reference to FIG. 5, the search can be executed in the direction from the downgrading threshold 550 towards to the discarding threshold 540. At Step 630, it is determined whether the free memory segment is found. At Step 680, if the free memory segment is found, the free memory segment is allocated to the logical memory segment.

Otherwise, at Step 640, a search is executed for a second free memory segment that have a second write count matching the second classification and higher than write counts of other free memory segments matching the second classification (e.g. for main memory use). In reference to FIG. 5, the search can be executed in the direction from the downgrading threshold 550 towards the bucket that has the lowest write count, such as bucket 8. At Step 650, it is determined whether the second free memory segment is found. If the second free memory segment is found, then at Step 660, the second free memory segment is allocated to the logical memory segment having the first classification. If the second free memory segment is not found, then at Step 670, the memory device is set as a worn out device, as the memory device has reached the end of its lifetime.

FIG. 7 is a flow chart for discarding a physical memory segment. At Step 710, a request is received to write to a physical memory segment allocated to a logical memory segment having the first classification (e.g. for long term storage use). At Step 720, usage statistics of the physical memory segment are updated, where usage statistics can include a write count of the physical memory segment. At Step 730, it is determined whether the write count is higher than a discarding threshold (e.g. 540, FIG. 5). If so, then at Step 740, a free memory segment that has a write count lower than the discarding threshold is allocated to the logical memory segment having the first classification. At Step 750, the physical memory segment originally requested to be written to is discarded.

FIG. 8 is a flow chart for allocating a free memory segment to a logical memory segment having the second classification in the logical memory space of the memory device. At Step 810, a request is received to allocate a free memory segment to a logical memory segment having the second classification (e.g. for main memory use). At Step 820, a search is executed for a free memory segment that has a write count matching the second classification and lower than write counts of other free memory segments matching the second classification. In reference to FIG. 5, the search can be executed in the direction from the bucket that has the lowest write count, such as bucket 8, to the downgrading threshold (e.g. 550). At Step 830, it is determined whether the free memory segment is found. If so, then at Step 890, the free memory segment is allocated to the logical memory segment.

Otherwise, at Step 840, a search is executed for a second memory segment having a write count matching the first classification and lower than write counts of other memory segments matching the first classification. At Step 850, it is determined whether the second memory segment is found. If so, then at Step 860, a search is executed for a second free memory segment having a write count matching the first classification, and at Step 870, data in the second memory segment is moved to the second free memory segment. At Step 880, the second memory segment is re-allocated to the logical memory segment having the second classification.

FIG. 9 is a flow chart for downgrading a physical memory segment. At Step 910, a request is received to write to a physical memory segment allocated to a logical memory segment having the second classification (e.g. for main memory use). At Step 920, usage statistics of the physical memory segment are updated, where usage statistics can include a write count of the physical memory segment. At Step 930, it is determined whether the write count is higher than a downgrading threshold (e.g. 550, FIG. 5). If so, then at Step 940, a free memory segment that has a second write count lower than the downgrading threshold is allocated to the logical memory segment. At Step 950, the physical memory segment originally requested to be written to is downgraded from being suitable for allocation to the second classification (e.g. for main memory use) to being suitable for allocation to the first classification (e.g. for long term storage use).

FIG. 10 is a flow chart for a link command. The host system can issue a link command via the storage device driver to the memory controller to redirect logical memory segments for main memory use to physical segments allocated for long term storage use, instead of issuing a command to physically copy data from a long term storage device to a main memory device.

As illustrated in the example of FIG. 10, at Step 1010, a command is received to link a first range of logical addresses having the first classification (e.g. for long term storage use) to a second range of logical addresses having the second classification (e.g. for main memory use). At Step 1020, it is determined whether physical memory segments are allocated to logical memory segments in the first range of logical addresses and the second range of logical addresses. If not, then at Step 1030, free physical memory segments are allocated to the logical memory segments. At Step 1040, indicators are set that indicate that the second range of logical addresses having the second classification is redirected. At Step 1050, linking information is set that redirects the second range of logical addresses having the second classification to physical segments allocated to the first range of logical addresses having the first classification. The linking information can include the page number and segment number in a memory segment entry in the memory segment table as described in connection with FIG. 2. The indicators and linking information can be saved in the management space (e.g. 190, FIG. 1). At Step 1060, the linking information can be loaded to a table lookaside buffer for use by the memory management system to improve speed of logical to physical address translation (e.g. 1060).

Figure 11:
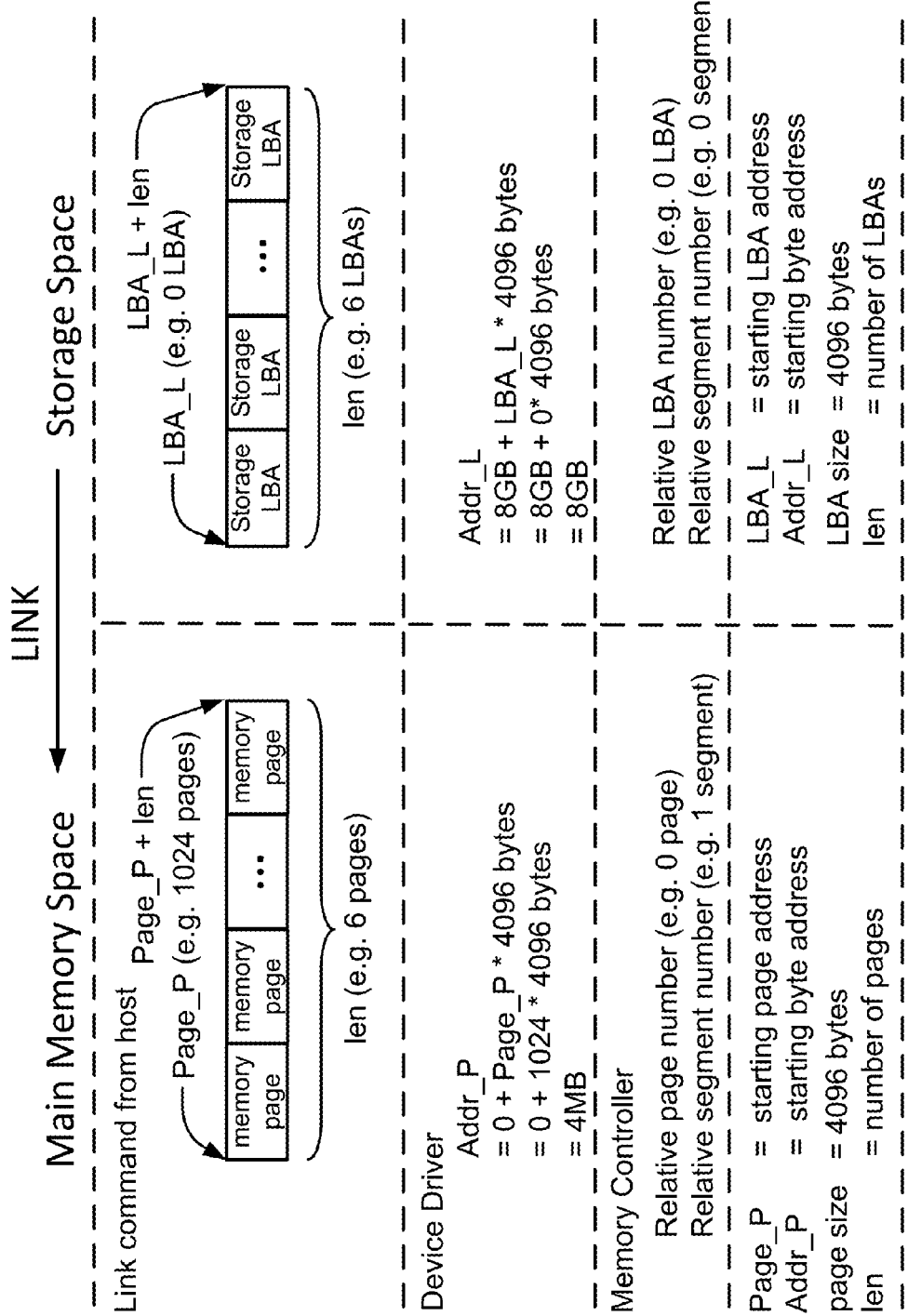
FIG. 11 is an example using the link command as in FIG. 10.

FIG. 11 is an example using the link command as described in FIG. 10. The example assumes that the logical memory space has a size of 64 GB, including the main memory space from 0 GB to 8 GB and the storage space from 8 GB to 64 GB. The physical memory space has a size of 64 GB for physical memory segments that can be allocated for main memory use and storage use. The example assumes that a logical memory segment has a size of 4 MB and includes multiple logical memory pages, and that a physical memory segment has a size of 4 MB and includes multiple physical LBAs (logical block addresses). As used in the present specification, a page represents a basic unit in the logical main memory space, and an LBA represents a basic unit in the logical storage space. In one implementation, a size of a page is the same as a size of an LBA, such that transformation between different sizes of a page and an LBA can be eliminated. For instance, a page can have a size of 4 KB, and an LBA can have the same size of 4 KB.

As illustrated in the example of FIG. 11, the storage device driver (e.g. 122, FIG. 1) receives a link command from the host system to link a first range of logical addresses in the storage space to a second range of logical addresses in the main memory space. The link command includes a first starting LBA address LBA_L of the first range, a second starting page address Page_P of the second range, and a length len indicating the number of consecutive LBAs in the first range and the number of consecutive pages in the second range. In the example, LBA_L=0, Page_P=1024, and len=6. Consequently, the first range is from LBA_L to (LBA_L+len), and the second range is from Page_P to (Page_P+len).

In one implementation, while the first range and the second range are in the LBA unit and the page unit respectively from the host system, the physical memory is in the byte unit as it is byte-addressable. The device driver translates the requested first range and second range in the LBA unit and in the page unit respectively into a series of requests in the byte unit corresponding to physical memory addresses. The device driver translates the starting LBA address LBA_L and the starting page address Page_P for the logical memory space in the LBA unit and in the page unit into corresponding starting byte addresses Addr_L and Addr_P for physical memory segments in the byte unit. The device driver translates the first range of logical addresses (e.g. LBA_L to (LBA_L+len)) into a first range of physical addresses (e.g. Addr_L to (Addr_L+size), and translates the second range of logical addresses (e.g. Page_P to (Page_P+len)) into a second range of physical addresses (e.g. Addr_P to (Addr_P+size)), where the size is a number of consecutive bytes equal to the size of the data in the len LBAs and len pages, so that the second range of logical addresses Page_P to (Page_P+len) is one-to-one mapped to the first range of logical addresses LBA_L to (LBA_L+len) in the physical memory segments.

As illustrated in the example of FIG. 11, given a page has 4096 bytes and an LBA has 4096 bytes, LBA_L=0 LBA, Page_P=1024 pages, the main memory space has addresses starting at 0 GB, and the storage space has addresses starting at 8 GB, Addr_L=8 GB+LBA_L*4096 bytes=8 GB+0*4096 bytes=8 GB;

Addr_P=0 GB+Page_P*4096 bytes=1024*4096 bytes=4 MB.

The device driver then sends a link command to the memory controller using the second range of physical addresses in the byte unit (e.g. Addr_P to (Addr_P+size)) and the first range of physical addresses in the byte unit (e.g. Addr_L to (Addr_L+size)).

In response to the link command from the device driver, the memory controller can translate the starting byte address Addr_L (e.g. 8 GB) into a relative LBA number of a first relative segment number relative to a starting LBA in a starting memory segment in the storage space, using the LBA size (e.g. 4096 bytes), the segment size (e.g. 4 MB), and the starting address of the storage space (e.g. 8 GB). In this example the relative LBA number is 0 and the first relative segment number is 0, consequently the starting byte address Addr_L corresponds to the starting LBA in the starting physical memory segment in the storage space.

The memory controller can translate the starting byte address Addr_P (e.g. 4 MB) into a relative page number of a second relative segment number relative to a starting page in a starting memory segment in the main memory space, using the page size (e.g. 4096 bytes), the segment size (e.g. 4 MB), and the starting address of the main memory space (e.g. 0 GB). In this example the relative page number is 0 and the second relative segment number is 1, consequently the starting byte address Addr_P corresponds to the first page in the second physical memory segment in the main memory space.

The memory controller can record indicators in the memory segment entry in the memory segment table that indicate that the second range of logical addresses is redirected. The indicators can include an indirect bit for each logical memory page in a logical memory segment in the main memory space. Each indirect bit can indicate whether its corresponding logical memory page is linked to a physical page allocated for long term storage use. For instance, a value '1' can indicate a logical memory page is linked, while a value '0' can indicate a logical memory page is not linked.

After the link command is executed, the first range of logical addresses in the first classification (e.g. for long term storage use) is linked to a physical page number and a physical segment number indicating a physical memory page allocated for the long term storage use. Consequently, from the point of view of the host system, the memory device acts as if the data is physically copied from a long term storage device to a main memory device.

FIG. 12 is a flow chart for an unlink command. The host system can issue an unlink command via the storage device driver to the memory controller, instead of issuing a command to physically write data back from a main memory device to a long term storage device.

As illustrated in the example of FIG. 12, at Step 1210, a command is received to unlink a range of logical addresses having the second classification (e.g. for main memory use) from physical segments allocated to logical addresses having the first classification (e.g. for long term storage use). At Step 1220, indicators that indicate that the range of logical addresses having the second classification is redirected are reset. At Step 1230, linking information that redirects the range of logical addresses having the second classification to logical addresses having the first classification is reset.

In one implementation, the range of logical addresses can be from Page_P to (Page_P+len), where Page_P is a starting page address and len is the number of consecutive pages starting at Page_P. The device driver translates the starting page address Page_P for the logical memory space in the page unit into corresponding byte address Addr_P for physical memory segments in the byte unit. The device driver translates the range of logical addresses (e.g. Page_P to (Page_P+len)) into a range of physical addresses (e.g. Addr_P to (Addr_P+size)), where the size is a number of consecutive bytes equal to the size of the data in the len pages. The device driver then sends an unlink command to the memory controller to unlink the range of physical addresses (e.g. Addr_P to (Addr_P+size)).

In response to the unlink command from the device driver, the memory controller resets the indicators that indicate that the range of logical addresses in the second classification is redirected, and resets the linking information that redirects the range of logical addresses, where the linking information can include the page number and segment number for the memory segment entry in the memory segment table (FIG. 2).

FIG. 13 is a flow chart for a free command. A free command can be provided to allow the host system to release a logical memory segment for main memory use that is no longer used by the host system. For instance, in the host system, each process can have its own address space that is mapped to a range of logical memory segments, and can request more memory (i.e. pages) from or release memory to the host system during its execution. When the process is terminated, the memory pages allocated to the process are returned to the host system.

In the example shown in FIG. 13, the host system (e.g. 110, FIG. 1) determines whether all the logical memory pages that fall in a range of a logical memory segment for main memory use are no longer used. If so, the host system issues a free command to the main memory device driver (e.g. 121, FIG. 1) to free the physical memory segment allocated to the logical memory segment (Step 1310). The free command references a logical segment number for the logical memory segment. The logical segment number referenced by the free command is relative to a starting logical memory segment number for all logical memory segments in the logical memory space in the host system.

In response to the free command from the host system, the main memory device driver adds the starting logical memory segment number to the logical segment number referenced by the free command to derive a second logical segment number. The second logical segment number can be translated to a corresponding physical segment number in the memory device (e.g. 170, FIG. 1) (Step 1320). The main memory device driver then issues a free command with the second logical segment number to the memory controller (e.g. 130, FIG. 1) (Step 1330).

The memory controller than translates the second logical segment number to a corresponding physical segment number in the memory device using the memory segment table (FIG. 2) (Step 1340). The memory controller (e.g. 140, FIG. 1) then issues a free command to the memory device with the corresponding physical segment number to release the physical memory segment having the corresponding physical segment number (Step 1350). In one implementation, the released physical memory segment can be inserted into a bucket in a set in the plurality of sets of buckets of free memory segments.

For example, the logical segment number for the logical memory segment in the host system is 5, the starting logical memory segment number for all logical memory segments in the host system is 0, and the second logical segment number is therefore 0+5=5. The memory segment table translates the second logical segment number of 5 to the physical segment number of 7. Consequently, the physical memory segment having the physical segment number of 7 is released.

The technology described herein is applicable to non-volatile memories including phase change memory, NOR flash, magnetic random access memory, and resistive random access memory. The joint main memory and storage translation layer described herein can be realized in hardware or any hardware layer of a memory management system, including MMU (memory management unit), CPU (central processing unit), and hardware IP (intellectual property) cores or blocks. The joint main memory and storage translation layer described herein can be applied to systems that contain integrated main memory and storage devices, including hybrid architectures that integrate main memory and storage memory in one device.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An apparatus, comprising:
   a memory device including a plurality of physical memory segments; and
   a memory controller coupled to the memory device, including:
   logic to classify a logical memory space into a plurality of classifications based on usage specifications, wherein the plurality of classifications includes a first classification and a second classification having different usage statistic requirements than the first classification;
   logic to allocate the plurality of physical memory segments to corresponding logical addresses based on the plurality of classifications, and on usage statistics of the physical memory segments;
   logic to receive a command to free a logical memory segment having a first logical segment number relative to a starting logical segment number for logical memory segments in the logical memory space;
   logic to derive a second logical segment number based on the first logical segment number and the starting logical segment number;
   logic to translate the second logical segment number to a physical segment number;
   logic to release a physical memory segment having the physical segment number in the plurality of physical memory segments; and
   logic to redirect logical addresses having the second classification to physical segments allocated to logical addresses having the first classification, and to update a data structure to record redirected logical addresses, wherein the data structure is maintained recording translation between logical addresses in the logical memory space and physical addresses of the physical memory segments.

2. The apparatus of claim 1, wherein the memory controller includes:
   logic to maintain a data structure recording translation between logical addresses in the logical memory space and physical addresses of the physical memory segments.

3. The apparatus of claim 1, wherein the memory controller includes:
   logic to maintain a plurality of sets of buckets of free memory segments based on usage statistics of the free memory segments; and
   logic to allocate a free memory segment to logical address in a particular classification in the plurality of classifications in a bucket corresponding to usage statistics that match the particular classification, and to remove the free memory segment from the bucket after said allocating.

4. The apparatus of claim 3, wherein the memory controller includes:
   logic to deallocate a physical memory segment, and to add the physical memory segment to a bucket in a set in the plurality of sets of buckets,
   wherein the physical memory segment has a usage statistic matching the usage statistics of the bucket to which it is added.

5. The apparatus of claim 1, wherein the logic to find and allocate includes:
   in response to a request to allocate a free memory segment to a logical memory segment having the first classification,
   logic to search for the free memory segment having a write count matching the first classification and lower than write counts of other free memory segments matching the first classification;
   logic to, if the free memory segment is found, allocate the free memory segment to the logical memory segment, otherwise search for a second free memory segment having a second write count matching the second classification and higher than write counts of other free memory segments matching the second classification; and logic to, if the second free memory segment is found, allocate the second free memory segment to the logical memory segment having the first classification.

6. The apparatus of claim 1, wherein the memory controller includes:

logic to search for a free memory segment having a write count matching the second classification and lower than other write counts of free memory segments matching the second classification;

logic to, if the free memory segment is found, allocate the free memory segment to the logical memory segment, otherwise search for a second memory segment having a write count matching the first classification and lower than write counts of other memory segments matching the first classification; and logic to, if the second memory segment is found, search for a second free memory segment having a write count matching the first classification, move data in the second memory segment to the second free memory segment, and then re-allocate the second memory segment to the logical memory segment having the second classification.

7. The apparatus of claim 1, wherein the memory controller includes:

logic responsive to a request to write to a physical memory segment allocated to a logical memory segment having the first classification, to update usage statistics of the physical memory segment; and logic to, if the updated usage statistics have a write count higher than a discarding threshold, allocate a free memory segment having a second write count lower than the discarding threshold to the logical memory segment; and discard the physical memory segment.

8. The apparatus of claim 1, wherein the memory controller includes:

logic responsive to a request to write to a physical memory segment allocated to a logical memory segment having the second classification to update usage statistics of the physical memory segment; and logic to, if the updated usage statistics have a write count higher than a downgrading threshold, allocate a free memory segment having a second write count lower than the downgrading threshold to the logical memory segment.

9. The apparatus of claim 1, wherein the memory controller includes:

logic responsive to a request to link a first range of logical addresses having the first classification to a second range of logical addresses having the second classification to, if a physical memory segment is not allocated to a logical memory segment in the first range of logical addresses or the second range of logical addresses, allocate a free physical memory segment to the logical memory segment;

logic to set indicators that indicate that the second range of logical addresses having the second classification is redirected; and logic to set linking information that redirects the second range of logical addresses having the second classification to physical segments allocated to the first range of logical addresses having the first classification.

10. The apparatus of claim 1, wherein the memory controller includes:

logic responsive to a request to unlink a range of logical addresses having the second classification from physical segments allocated to logical addresses having the first classification to reset indicators that indicate that the range of logical addresses having the second classification is redirected; and logic to reset linking information that redirects the range of logical addresses having the second classification.

11. The apparatus of claim 1, wherein the memory device is on an integrated circuit, and the memory controller comprises logic on the integrated circuit.

12. The apparatus of claim 1, wherein the memory device comprises memory cells including phase change memory materials.

13. A method for operating a memory device including a plurality of physical memory segments, comprising:

classifying logical addresses in a logical memory space into a plurality of classifications based on usage specifications, wherein the plurality of classifications includes a first classification and a second classification having different usage statistic requirements than the first classification, using logic controlling the memory;

allocating the plurality of physical memory segments to corresponding logical addresses based on the plurality of classifications, and on usage statistics of the physical memory segments, using logic controlling the memory;

receiving a command to free a logical memory segment having a first logical segment number relative to a starting logical segment number for logical memory segments in the logical memory space, using logic controlling the memory;

deriving a second logical segment number based on the first logical segment number and the starting logical segment number, using logic controlling the memory;

translating the second logical segment number to a physical segment number, using logic controlling the memory;

releasing a physical memory segment having the physical segment number in the plurality of physical memory segments, using logic controlling the memory; and redirecting logical addresses having the second classification to physical segments allocated to logical addresses having the first classification, and updating a data structure to record redirected logical addresses, wherein the data structure is maintained recording translation between logical addresses in the logical memory space and physical addresses of the physical memory segments, using logic controlling the memory.

14. The method of claim 13, comprising:

maintaining a data structure recording translation between logical addresses in the logical memory space and physical addresses of the physical memory segments.

15. The method of claim 13, wherein said allocating includes:

maintaining a plurality of sets of buckets of free memory segments based on usage statistics of the free memory segments; and allocating a free memory segment to a logical address in a particular classification in the plurality of classifications in a bucket corresponding to usage statistics that match the particular classification, and removing the free memory segment from the bucket after said allocating.

16. The method of claim 15, comprising:
deallocating a physical memory segment, and adding the physical memory segment to a bucket in a set in the plurality of sets of buckets,
wherein the physical memory segment has a usage statistic matching the usage statistics of the bucket to which it is added.

17. The method of claim 13, comprising:
in response to a request to allocate a free memory segment to a logical memory segment having the first classification,
searching for the free memory segment having a write count matching the first classification and lower than write counts of other free memory segments matching the first classification;
if the free memory segment is found, allocating the free memory segment to the logical memory segment, otherwise searching for a second free memory segment having a second write count matching the second classification and higher than write counts of other free memory segments matching the second classification; and
if the second free memory segment is found, allocating the second free memory segment to the logical memory segment having the first classification.

18. The method of claim 13, comprising:
in response to a request to allocate a free memory segment to a logical memory segment having the second classification,
searching for the free memory segment having a write count matching the second classification and lower than write counts of other free memory segments matching the second classification;
if the free memory segment is found, allocating the free memory segment to the logical memory segment, otherwise searching for a second memory segment having a write count matching the first classification and lower than write counts of other memory segments matching the first classification; and
if the second memory segment is found, searching for a second free memory segment having a write count matching the first classification, moving data in the second memory segment to the second free memory segment, and then re-allocating the second memory segment to the logical memory segment having the second classification.

19. The method of claim 13, comprising:
in response to a request to write to a physical memory segment allocated to a logical memory segment having the first classification,
updating usage statistics of the physical memory segment; and
if the updated usage statistics have a write count higher than a discarding threshold, allocating a free memory segment having a second write count lower than the discarding threshold to the logical memory segment; and discarding the physical memory segment.

20. The method of claim 13, comprising:
in response to a request to write to a physical memory segment allocated to a logical memory segment having the second classification,
updating usage statistics of the physical memory segment; and
if the updated usage statistics have a write count higher than a downgrading threshold, allocating a free memory segment having a second write count lower than the downgrading threshold to the logical memory segment.

21. The method of claim 13, comprising:
in response to a request to link a first range of logical addresses having the first classification to a second range of logical addresses having the second classification,
if a physical memory segment is not allocated to a logical memory segment in the first range of logical addresses or the second range of logical addresses, allocating a free physical memory segment to the logical memory segment;
setting indicators that indicate that the second range of logical addresses having the second classification is redirected; and
setting linking information that redirects the second range of logical addresses having the second classification to physical segments allocated to the first range of logical addresses having the first classification.

22. The method of claim 13, comprising:
in response to a request to unlink a range of logical addresses having the second classification from physical segments allocated to logical addresses having the first classification,
resetting indicators that indicate that the range of logical addresses having the second classification is redirected; and
resetting linking information that redirects the range of logical addresses having the second classification.

* * * * *